(12) United States Patent
Patel et al.

(10) Patent No.: US 10,425,508 B1
(45) Date of Patent: Sep. 24, 2019

(54) SYSTEM FOR IDENTIFYING IDLE TIME OF A PROTOCOL TO FACILITATE COMMUNICATION USING MULTIPLE PROTOCOLS

(71) Applicant: AMAZON TECHNOLOGIES, INC., Seattle, WA (US)

(72) Inventors: Pratik Kalpesh Patel, Sunnyvale, CA (US); Ateet Kapur, San Francisco, CA (US); Milos Jorgovanovic, Mountain View, CA (US); Morris Yuanhsiang Hsu, Sunnyvale, CA (US); Latha Srinivasan, Cupertino, CA (US); Jian Lu, Los Gatos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/612,430

(22) Filed: Jun. 2, 2017

(51) Int. Cl.
*H04L 29/06* (2006.01)
*H04W 4/80* (2018.01)
*H04L 12/26* (2006.01)
*H04W 24/02* (2009.01)
*H04W 84/12* (2009.01)
*H04W 80/00* (2009.01)

(52) U.S. Cl.
CPC .......... *H04L 69/18* (2013.01); *H04L 43/0888* (2013.01); *H04W 4/80* (2018.02); *H04W 24/02* (2013.01); *H04W 80/00* (2013.01); *H04W 84/12* (2013.01)

(58) Field of Classification Search
None
See application file for complete search history.

(56) References Cited

U.S. PATENT DOCUMENTS

| 2010/0046498 | A1* | 2/2010 | Hall | H04W 56/0015 370/350 |
| 2010/0329202 | A1* | 12/2010 | Sun | H04W 72/1215 370/329 |
| 2011/0310826 | A1* | 12/2011 | Sun | H04W 72/00 370/329 |
| 2013/0260686 | A1* | 10/2013 | Mukherjee | G06F 9/5027 455/41.2 |

* cited by examiner

*Primary Examiner* — Alejandro Rivero
(74) *Attorney, Agent, or Firm* — Lindauer Law, PLLC (57) ABSTRACT

Described are techniques for enabling a computing device, such as a slave device using a Bluetooth Advanced Audio Distribution Protocol (A2DP), to determine times when a master device is likely to be idle, during which communications using an alternate protocol, such as Wi-Fi may be exchanged. The length of a delay period may be determined based in part on counts of successive communications received from a master device. The length of a transmission period for use of the alternate protocol may be determined based in part on lengths of time between sets of communications received from a master device. If no communication is received from the master device for a length of time greater than or equal to the delay period, data may be communicated using the alternate protocol for a length of time less than or equal to the transmission period.

20 Claims, 6 Drawing Sheets

SYSTEM FOR IDENTIFYING IDLE TIME OF A PROTOCOL TO FACILITATE COMMUNICATION USING MULTIPLE PROTOCOLS

BACKGROUND

Audio devices, and other types of computing devices, may be configured to communicate using multiple protocols, such as Wi-Fi and Bluetooth. In some cases, communication using a first protocol may constrain the abilities of the device to communicate using a second protocol.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Some wireless communication devices may be configured to communicate using multiple protocols. For example, a device may include multiple wireless radios, each of which communicates using a different protocol. Continuing the example, a first wireless radio may be used to communicate using a Wi-Fi protocol, and a second wireless radio may communicate using a Bluetooth protocol. When a device transmits or receives data using a first protocol, this may hinder or wholly prevent transmission or reception of data using a second protocol.

For example, an audio device may communicate via a Bluetooth communication link using an Advanced Audio Distribution Profile (A2DP). When using the A2DP protocol, the audio device may enter a receive state in which the audio device attempts to receive data from a master device. For example, an audio device may briefly initiate a "listening window" having a selected length (e.g., 0.2 milliseconds (ms)), and may periodically initiate listening windows after passage of a selected time period (e.g., every 1.25 ms). If the audio device determines the transmission of a Bluetooth communication from the master device during an attempt to receive data, a transaction may be initiated during which one or multiple data packets may be exchanged with the master device via the Bluetooth communication link. If the audio device is acting as a Bluetooth sink, the audio device may receive audio data, or other types of data, from the master device then transmit an acknowledgement, responsive to which the master device may transmit a subsequent data packet. If the audio device is acting as a Bluetooth source, the audio device may receive a request from the master device, responsive to which the audio device may transmit a data packet to the master device via the Bluetooth communication link. Subsequent to transmission of the data packet, the audio device may receive a subsequent request from the master device. Once the Bluetooth transaction has concluded, such as after each data packet within the buffer of the Bluetooth source device has been transmitted, the audio device may resume attempting to receive communications from the master device.

While exchanging data during the Bluetooth transaction, the audio device may be unable to transmit or receive data using the Wi-Fi protocol. Additionally, the audio device may be unable to transmit or receive data using a Wi-Fi protocol during each attempt to receive data via a Bluetooth listening window. While the audio device may communicate Wi-Fi data between each Bluetooth listening window, the periodic attempts to receive Bluetooth data may significantly constrain the transmission or reception of Wi-Fi data, resulting in a negative user experience.

Described in this disclosure are techniques for enabling an audio device that communicates with a master device using a first protocol, such as Bluetooth, to determine times when the master device is likely to be idle, such as times when a Bluetooth source device is currently buffering or otherwise preparing data packets for a future transmission. The audio device may cease attempting to receive communications using the first protocol during these time periods and may instead communicate using a second protocol, such as Wi-Fi, for a selected time period. Cessation of communications using the first protocol for a length of time may enable communications using the second protocol to occur uninterrupted, resulting in an improved user experience when compared to interrupted transmission of data between listening windows. Additionally, the identification of times when a master device is likely to be idle may prevent the communication of data using the second protocol from interfering with communications with the master device using the first protocol.

To determine a length of time during which a master device is likely to be idle, a slave device may receive at least two sets of communications from the master device. Each set of communications may be associated with a first protocol. For example, a slave device may communicate with a master device via a Bluetooth communication link using the A2DP protocol. In some cases, the first device may act as a sink device that receives one or more data packets from the master device, then transmits an acknowledgement to the master device. In other cases, the first device may act as a source device that receives a request from the master device, then transmits one or more data packets to the master device responsive to the request. The slave device may determine a count of communications that occur within each set of communications exchanged with the master device. For example, a first set of communications may include two consecutive transmissions while a second set of communications that occur subsequent to the first set may include three consecutive transmissions. A set of communications may include any number of consecutive transmissions, from a single transmission to three or more transmissions. The slave device may determine counts of communications associated with any number of sets of communications received from the master device. Based on the counts of communications determined for each set, a delay time may be determined. The delay time may include a length of time, after receipt of a communication, that the slave device may wait to receive an additional communication from the master device. If no communication is received from the master device during the delay time, this may indicate that the master device has become idle. After the delay time has lapsed, the slave device may begin communicating data using a second protocol, such as Wi-Fi, and cease attempting to receive data using the first protocol.

The slave device may also determine a length of time between a first set of communications received from the master device and a second set of communications. Additionally, if other sets of communications are received, the slave device may determine lengths of time between subsequent sets of communications received from the master device. The lengths of time between sets of communications may correspond to time periods when the master device is idle, such as time periods when a source device is buffering or otherwise preparing subsequent data for transmission. Based on the lengths of time between sets of communications, a time period (e.g., an idle time for the master device) during which the slave device may communicate data using the second protocol may be determined. For example, the time period for communication using the second protocol may be less than or equal to the average length of time between sets of communications received from the master device.

After determining the delay time and the length of the transmission period, a slave device may communicate using both the first and second protocols at respective times. For example, a slave device may communicate with a master device via a Bluetooth communication link using the A2DP protocol. The slave device may initiate a receive state during which the slave device attempts to receive communications from the master device, such as by initiating a 0.2 ms Bluetooth listening window every 1.25 ms. Between each listening window, the slave device may communicate Wi-Fi data with one or more other devices. When a communication from the master device is detected during a listening window, the slave device and master device may initiate a Bluetooth transaction during which data packets are exchanged between the slave device and master device. The slave device may cease communication using a Wi-Fi protocol during the Bluetooth transaction. If the slave device is functioning as a Bluetooth sink, the master device may transmit one or more data packets to the slave device, responsive to which the slave device may transmit an acknowledgement to the master device. The master device may transmit a single data packet, or set of data packets, to the slave device, or the master device may transmit multiple consecutive data packets or sets of data packets. If the slave device is functioning as a Bluetooth source, the master device may transmit a request to the slave device, responsive to which the slave device may transmit one or more data packets to the master device. The master device may transmit any number of subsequent requests to the slave device.

After each exchange of data with the master device via the Bluetooth communication link, the slave device may determine whether the determined delay time has lapsed. If no communication is received from the master device within the determined delay time period, this may indicate that the master device has become idle. After the lapse of the delay time, the slave device may cease attempting to receive communications from the master device. For example, the slave device may cease initiating Bluetooth listening windows during the determined transmission period. The slave device may then begin communicating Wi-Fi data with one or more other devices until the transmission period has lapsed. As described previously, the transmission period may have a length less than or equal to the length of time that the master device is expected to remain idle between sets of communications. After the transmission period has lapsed, the slave device may initiate the receive state and begin attempting to receive transmissions from the master device in anticipation of a subsequent set of communications. In the event that one or more communications from the master device occurred during the transmission period and were not detected by the slave device, the subsequent set of communications may include one or more retransmitted communications that were not received by the slave device. In some implementations, if a count of retransmitted communications exceeds a threshold count, the length of the transmission period may be shortened.

In some implementations, other metric data associated with the transmissions using the first protocol and second protocol may affect the lengths of the delay time and the transmission period. For example, a bit rate, a data throughput value, an airtime utilization value, a data compression rate, a data type or format, or other characteristics associated with a Bluetooth communication may be used to determine or modify the delay time. Continuing the example, if a bit rate, data throughput value, or data compression rate for a Bluetooth transmission is low, then a master device may be more likely to transmit a larger number of successive communications to a slave device. Conversely, if the bit rate, data throughput value, or data compression rate is high, then the master device may be capable of completing a Bluetooth transaction using a smaller number of successive communications. As another example, the transmission time associated with a set of communications exchanged with the master device, or the transmission time associated with individual communications within a set, may affect the delay time. For example, if a greater amount of time is used to exchange data with the master device, the delay time may be longer and the transmission period may be shorter than if a lesser amount of time is used to complete a Bluetooth transaction. As yet another example, a bit rate, a data throughput value, an airtime utilization value, a data compression rate, a data type or format, or other characteristics associated with one or more Wi-Fi communications may be used to determine or modify the transmission period. For example, if the bit rate or data throughput value associated with a Wi-Fi transmission are high, or if the airtime utilization value associated with use of Wi-Fi resources by the slave device is low, a shorter transmission period may be sufficient for completing Wi-Fi communications using the slave device. Conversely, if the bit rate or data throughput value are low or if the airtime utilization value is high, a longer transmission period time for completing Wi-Fi communications may be used.

As subsequent sets of communications between the master device and the slave device occur, the delay time and the transmission period may be modified. For example, if either the slave device or the master device is moved or if a source of interference affects transmissions between the devices, the master device may begin to transmit different counts of successive communications and remain idle for different lengths of time. Responsive to changes in the counts of successive communications within a set, the delay time may be modified. Responsive to changes in the length of time between sets of communications from the master device, the transmission period may be modified.

Figure 1:
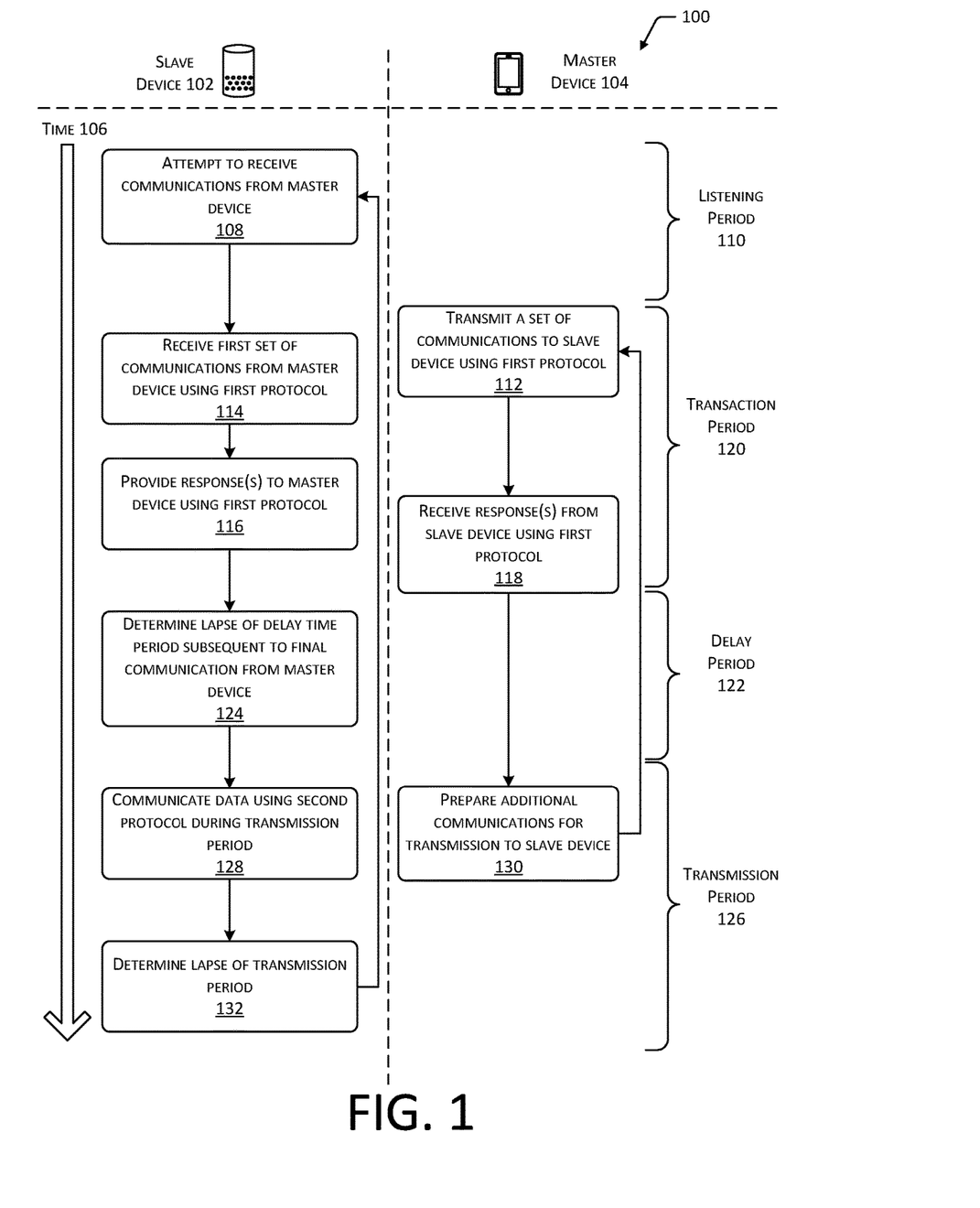
FIG. 1 is a flow diagram depicting an implementation of a method for enabling a slave device to communicate using multiple protocols.

FIG. 1 is a flow diagram 100 depicting one possible implementation of a method for enabling a slave device 102 to communicate using multiple protocols, such as a Bluetooth protocol and a Wi-Fi protocol. For example, the slave device 102 may be an audio device that communicates with a master device 104 via a Bluetooth communication link to receive audio data from, or transmit audio data to, the master device 104. While FIG. 1 depicts the slave device 102 as a freestanding networked speaker and the master device 104 as a smartphone, the slave device 102 and master device 104 may include any type of computing devices including, without limitation, a server, a desktop, laptop, or other type of personal computer, a smartphone, notebook, tablet computer, palm-top computer, or other type of portable computing devices, a wearable computing device, an automotive computing device, a gaming system, a smart television, a set-top box, and so forth. Additionally, while FIG. 1 depicts a single slave device 102 and a single master device 104, any of the functions described herein with regard to either the slave device 102 or the master device 104 may be performed using multiple computing devices.

In FIG. 1, the passage of time 106 is illustrated using an arrow that progresses from the top of the figure toward the bottom thereof. In some implementations, the slave device 102 may communicate with the master device 104 using the A2DP Bluetooth protocol. For example, at block 108, the slave device 102 may initiate a listening period 110 (e.g., a receive state), during which the slave device 102 is configured to receive communications from the master device 104. Continuing the example, at block 108, the slave device 102 may attempt to receive communications from the master device 104, such as by initiating one or more Bluetooth listening windows during which a communication may be received from the master device 104. In some implementations, a listening window may occur for a selected length of time, such as 0.2 ms, and during the listening period 110, the slave device 102 may initiate listening windows on a periodic basis, such as once every 1.25 ms. In some implementations, during the listening period 110, the slave device 102 may also communicate data using a second protocol, such as Wi-Fi, at times when listening windows are not occurring. However, at times when the listening windows are initiated, communication by the slave device 102 using the second protocol may be hindered or prevented.

At block 112, the master device 104 may transmit a first set of communications to the slave device 102 using the first protocol. At block 114, the slave device 102 may receive the first set of communications from the master device 104. At block 116, the slave device 102 may provide one or more responses to the master device 104 using the first protocol.

At block 118, the master device 104 may receive the response(s) from the slave device 102. The exchange of communications and responses between the master device 104 and the slave device 102 may constitute a transaction period 120. In some cases, transmission of data by the slave device 102 using the second protocol may be hindered or prevented during the transaction period 120.

In some implementations, the slave device 102 may function as a sink device while the master device 104 functions as a source device. For example, block 112 may include transmitting audio data, or another type of data, from the master device 104 to the slave device 102, and block 116 may include providing an acknowledgement of receipt of the data from the slave device 102 to the master device 104. In some cases, the set of communications transmitted by the master device 104 may include multiple successive communications, and subsequent to receiving the response from the slave device 102, the master device 104 may transmit a subsequent communication.

In other implementations, the slave device 102 may function as a source device while the master device 104 functions as a sink device. For example, block 112 may include transmitting a request from the master device 104 to the slave device 102, and block 116 may include providing audio data, or another type of data, from the slave device 102 to the master device 104 responsive to the request. The set of communications transmitted by the master device 104 may include multiple successive communications, and subsequent to receiving the data from the slave device 102, the master device 104 may transmit a subsequent request for additional data.

After the final communication is received from the master device 104, the slave device 102 may initiate a delay period 122 to determine whether the master device 104 has become idle. For example, after transmitting a final communication, the master device 104 may become idle for a period of time, such as twenty milliseconds or longer, while additional communications are buffered or otherwise prepared for transmission to the slave device 102. If the slave device 102 does not receive a communication from the master device 104 during the delay period 122, this may indicate that the master device 102 has become idle. For example, at block 124, the slave device 102 may determine a lapse of a delay time period of 0.625 ms to 1.25 ms subsequent to the final communication received from the master device 104. In some implementations, the length of the delay period 122 may be determined based at least in part on the count of communications received from the master device 104 over time. For example, if the master device 104 typically provides a large number of successive communications to the slave device 102, the delay period 122 may be longer than if the master device 104 typically provides a small number of successive communications to the slave device 102. In other implementations, the length of the delay period 122 may be determined based at least in part on other factors, such as a transaction length that is indicative of the time used to transmit a set of communications from the master device 104 to the slave device 102 or the time used to transmit one or more single communications within a set. For example, the delay period 122 may be longer if the master device 104 typically uses a large amount of time to transmit communications to the slave device 102 and smaller if the master device 104 typically uses a small amount of time to transmit the communications. As another example, other metric data associated with the communications using the first protocol may affect the length of the delay period 122. Metric data may include one or more of a bit rate, a data throughput value, an airtime utilization value, a data compression rate, a data type or format, or other characteristics associated with communication using the first protocol. Continuing the example, a greater bit rate, throughput value, or data compression rate, or a lesser airtime utilization may result in a shorter delay period 122 than a lesser bit rate, throughput value, or data compression rate or a greater airtime utilization.

After determining the lapse of the delay period 122, the slave device 102 may initiate a transmission period 126 during which the slave device 102 may cease attempting to receive communications from the master device 104 and instead communicate data using the second protocol. For example, at block 128, the slave device 102 may communicate data using the second protocol during the transmission period 126. Continuing the example, block 128 may include ceasing initiation of Bluetooth listening windows to receive communications from the master device 104, and exchanging data using a Wi-Fi protocol with one or more other devices. Because the slave device 102 is not attempting to receive communications using the first protocol from the master device 104 during the transmission period 126, the transmission period 126 may enable continuous and uninterrupted communication using the second protocol. Additionally, at block 130, during the transmission period 126, the master device 104 may prepare additional communications for transmission to the slave device 102.

In some implementations, the length of the transmission period 126 may be determined based in part on the length of time between sets of communications received by the slave device 102 from the master device 104. For example, the slave device 102 may determine the lengths of time periods between sets of communications received from the master device 104 over a period of time and set the length of the transmission period 126 to less than or equal to the average length of time between sets of communications from the master device 104.

In some implementations, the length of the transmission period 126 may be determined based on other factors, such as a transaction length that is indicative of the time used to transmit a set of communications or one or more individual communications from the master device 104 to the slave device 102, the bit rate, data throughput value, airtime utilization value, data compression rate, or data type or format associated with communications using the first protocol or second protocol, and so forth. For example, if the airtime utilization value associated with use of the second protocol is high or if the bit rate or data throughput value associated with use of the second protocol is low, the transmission period 126 may be longer than if the airtime utilization value is low and the bit rate or data throughput value are high. Additionally, in some implementations, the length of the transmission period 126 may be modified if the length of time between sets of communications received from the master device 104 changes or if other metric data associated with communication using the first protocol or the second protocol changes.

At block 132, the slave device 102 may determine that the transmission period 126 has lapsed. Subsequent to the lapse of the transmission period 126, the slave device 102 may initiate a listening period 110, and the method may return to block 108. Additionally, after the master device 104 has prepared additional communications for transmission to the slave device 102, as indicated at block 130, the method may return to block 112, and the master device 104 may transmit the prepared set of communications to the slave device 102.

Figure 2:
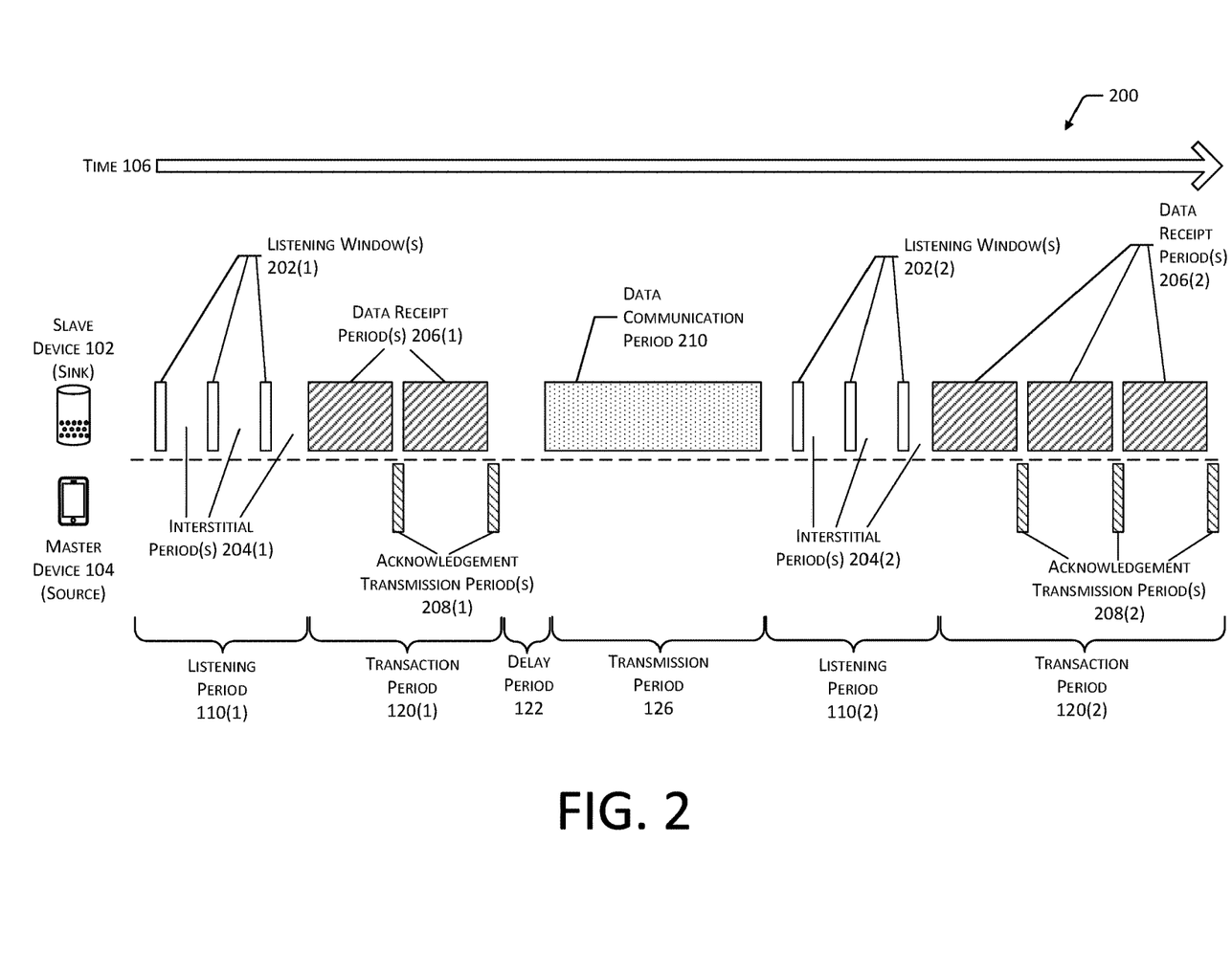
FIG. 2 is a diagram depicting interactions between a slave device and a master device in which the slave device functions as a sink device.

FIG. 2 is a diagram 200 depicting interactions between a slave device 102 and a master device 104 in which the slave device 102 functions as a sink device. The passage of time 106 is illustrated by the arrow extending from the left side of FIG. 2 toward the right side thereof. As described with regard to FIG. 1, the slave device 102 may attempt to receive communications from the master device 104 during a listening period 110(1) by initiating one or more listening windows 202(1), such as once every 1.25 ms. A listening window 202(1) may include a brief attempt, by the slave device 102, to detect a communication from the master device 104 using a first protocol. The listening windows 202(1) may have a selected length, such as 0.2 ms. During the time periods that correspond to the listening windows 202(1), communication by the slave device 102 using a second protocol may be hindered or prevented. However, due to the short length of the listening windows 202(1) compared to the length of the periodic time intervals after which a listening window 202(1) is initiated, the listening period 110(1) may include one or more interstitial periods 204(1) between the times corresponding to the listening windows 202(1). In some implementations, the slave device 102 may communicate data using the second protocol during one or more of the interstitial periods 204(1). For example, the listening windows 202(1) may include attempts to detect a communication from the master device 104 using a Bluetooth protocol, such as A2DP, while the slave device 102 may communicate data using a Wi-Fi protocol during the interstitial periods 204(1). While FIG. 2 depicts the listening period 110(1) including three listening windows 202 and associated interstitial periods 204, a listening period 110 may occur for any length of time and may include any number of listening windows 202 and interstitial periods 204.

When the slave device 102 detects a communication from the master device 104 during a listening window 202(1), the transaction period 120(1), described with regard to FIG. 1, may be initiated. During the transaction period 120(1), the master device 104 may provide one or more data packets to the slave device 102, responsive to which the slave device 102 may provide an acknowledgement to the master device 104. For example, FIG. 2 depicts the transaction period including two data receipt periods 206(1). During a data receipt period 206(1), the master device 104 may transmit one or more data packets to the slave device 102, which may receive the data packets. After completion of a data receipt period 206(1), the slave device 102 may transmit an acknowledgement to the master device 104 during an acknowledgement transmission period 208(1). Subsequent to transmission of an acknowledgement from the slave device 102 to the master device 104, the master device 104 may transmit a subsequent data packet or set of data packets to the slave device 102. For example, FIG. 2 depicts a first transaction period 120(1) that includes two successive data receipt periods 206(1) and two corresponding acknowledgement transmission periods 208(1). During the transaction period 120(1), while the slave device 102 is transmitting or receiving data using a first protocol, such as Bluetooth, communication using a second protocol, such as Wi-Fi, may be hindered or prevented.

Subsequent to receiving a final data packet from the master device 104 and transmitting a final acknowledgement, the slave device 102 may delay initiation of the transmission period 126 for a selected amount of time. For example, subsequent to the end of the transaction period 120(1), the slave device 102 may initiate a delay period 122 to determine whether the master device 104 has become idle, or whether a subsequent communication may be received from the master device 104. If no communication is received from the master device 104 prior to the lapse of the delay period 122, then this may indicate that the master device 104 has become idle. In some implementations, the delay period 122 may have a length ranging from 0.625 ms to 1.25 ms.

Subsequent to the lapse of the delay period 122, the slave device 102 may initiate a transmission period 126 during which the slave device 102 does not attempt to receive communications from the master device 104. For example, during the transmission period 126, the slave device 102 may refrain from initiating listening windows 202 to receive communications from the master device 104. At least a portion of the transmission period 126 may include a data communication period 210 during which the slave device 102 may communicate data using the second protocol. During the data communication period 210, the slave device may transmit data using the second protocol, receive data using the second protocol, or both transmit and receive data. During the data communication period 210, the slave device 102 may exchange data using the second protocol with any number and any type of devices capable of communication with the slave device 102. In some cases, the slave device 102 may communicate with the master device 104 using the second protocol. In some implementations, the data communication period 210 may occupy substantially all of the transmission period 126. In other implementations, the data communication period 210 may have a length less than that of the transmission period 126.

Subsequent to the lapse of the transmission period 126, the slave device 102 may initiate a second listening period 110(2), during which the slave device may resume attempting to detect communications from the master device 104. For example, during the second listening period 110(2), the slave device 102 may initiate one or more listening windows 202(2). In some cases, the slave device 102 may communicate data using the second protocol during the interstitial periods 204(2) between the listening windows 202(2) of the second listening period 110(2).

If the slave device 102 detects a communication from the master device 104 during a listening window 202(2), a second transaction period 120(2) may be initiated. During the second transaction period 120(2), the master device 104 may transmit one or more data packets to the slave device 102, which may receive the data packets during data receipt periods 206(2). Subsequent to each data receipt period 206(2), the slave device 102 may transmit an acknowledgement to the master device 104 during an acknowledgement transmission period 208(2). While FIG. 2 depicts the second transaction period 120(2) including three data receipt periods 206(2) and three corresponding acknowledgement transmission periods 208(2), a transaction period 120(2) may include any number of consecutive communications from the master device 104 to the slave device 102. Subsequent to the second transaction period 120(2), an additional delay period 122 and an additional transmission period 126 may be initiated to facilitate communication of the slave device 102 using the second protocol.

Figure 3:
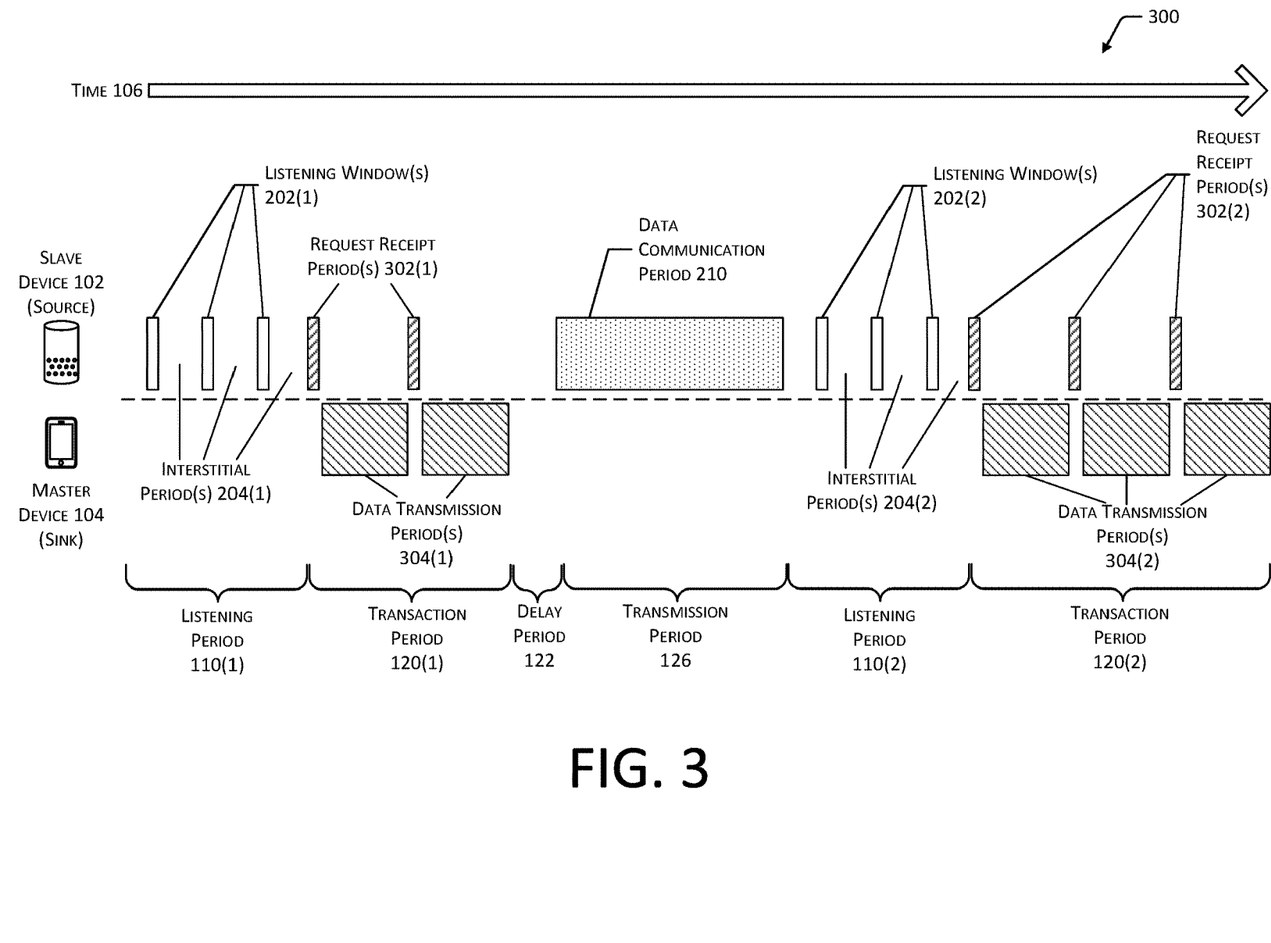
FIG. 3 is a diagram depicting interactions between a slave device and a master device in which the slave device functions as a source device.

FIG. 3 is a diagram depicting interactions between a slave device 102 and a master device 104 in which the slave device 102 functions as a source device. The passage of time 106 is illustrated by the arrow extending from the left side of FIG. 3 toward the right side thereof. As described with regard to FIG. 2, the slave device 102 may initiate a listening period 110(1) during which the slave device 102 may attempt to receive communications associated with a first protocol from the master device 104. For example, during the listening period 110(1), the slave device 102 may periodically (e.g., every 1.25 ms or a different time period) initiate a listening window 202(1) having a selected length (e.g., 0.2 ms). In some implementations, the slave device 102 may communicate data using a second protocol during the interstitial periods 204(1) between the listening windows 202(1).

If the slave device 102 detects a communication from the master device 104, a transaction period 120(1) may be initiated. During the transaction period 120(1), the master device 104 may provide a request for data to the slave device 102, which may receive the request during a request receipt period 302(1). Responsive to the request, the slave device 102 may transmit one or more corresponding data packets to the master device 104 during one or more data transmission periods 304(1). While FIG. 3 depicts the transaction period 120(1) including two consecutive request receipt periods 302(1) and two associated data transmission periods 304(1), the master device 104 may provide any number of consecutive requests to the slave device 102, responsive to which the slave device 102 may provide data to the master device 104.

Subsequent to completing a final data transaction with the master device 104, the slave device 102 may delay initiation of the transmission period 126 for a selected length of time (e.g., the delay period 122). If no communication is received from the master device 104 during the delay period 122, the slave device 102 may initiate the transmission period 126. As described with regard to FIG. 2, at least a portion of the transmission period 126 may include a data communication period 210 during which the slave device 102 may communicate data with one or more other devices using a second protocol.

Subsequent to the lapse of the transmission period 126, the slave device 102 may initiate a second listening period 110(2), which may include the initiation of one or more listening windows 202(2). The listening period 110(2) may also include interstitial periods 204(2) between the listening windows 202(2) during which the slave device 102 may communicate data using the second protocol. If the slave device 102 detects a communication from the master device 104 during a listening window 202(2), the slave device may initiate a transaction period 120(2). During the transaction period 120(2), the slave device 102 may receive requests from the master device 104 during request receipt periods 302(2), responsive to which the slave device 102 may provide data to the master device 104 during corresponding data transmission periods 304(2). While FIG. 3 depicts the second transaction period 120(2) including three consecutive request receipt periods 302(1) and three associated data transmission periods 304(1), the master device 104 may provide any number of consecutive requests to the slave device 102, responsive to which the slave device 102 may provide data to the master device 104. Subsequent to the second transaction period 120(2), the slave device 102 may initiate an additional delay period 122 and transmission period 126.

Figure 4:
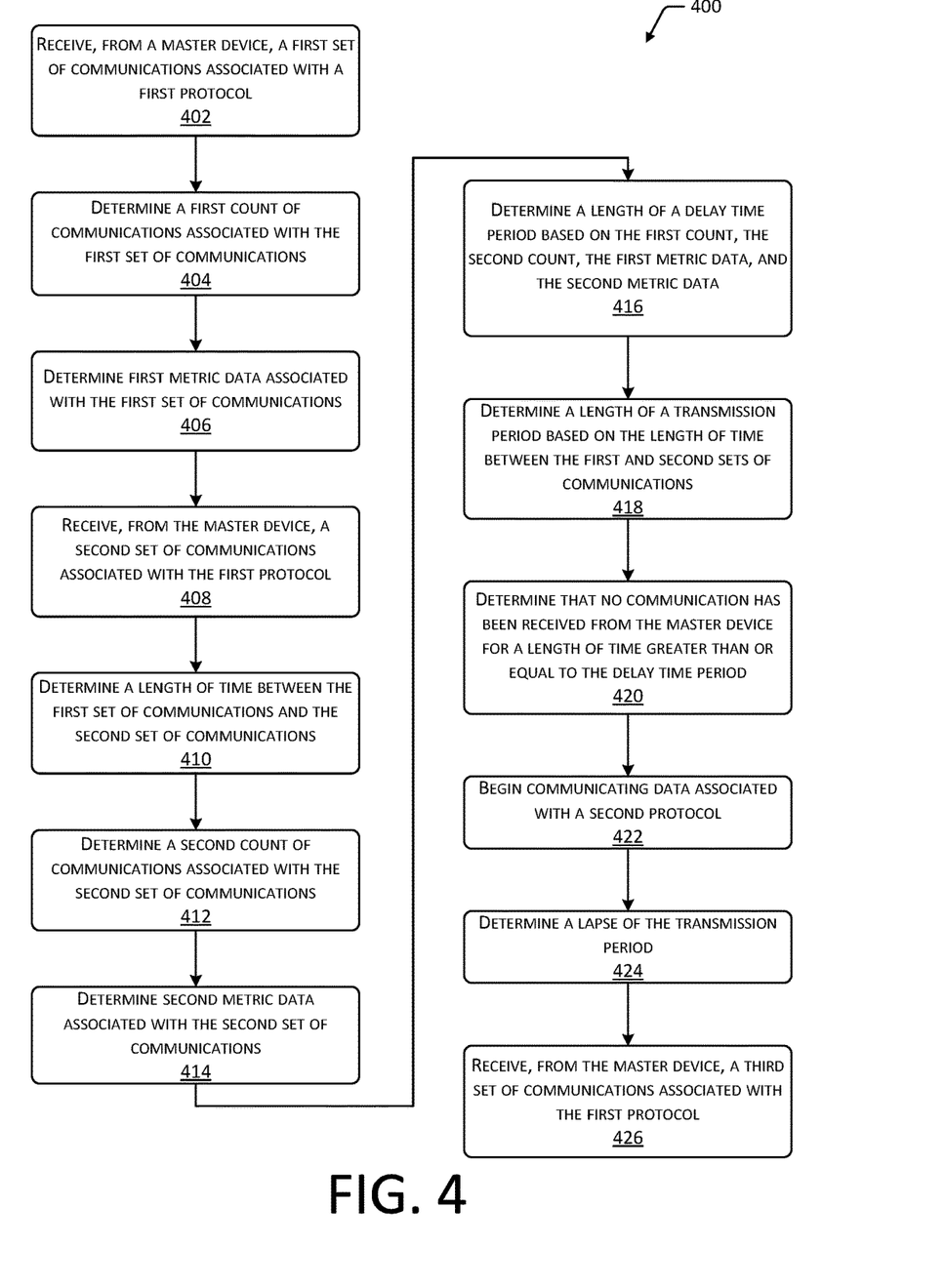
FIG. 4 is a flow diagram illustrating a method for determining a length of a delay period and a length of a transmission period based on communications received, by a slave device, from a master device.

FIG. 4 is a flow diagram 400 illustrating a method for determining a length of a delay period 122 and a length of a transmission period 126 based on communications received, by a slave device 102, from a master device 104. At block 402, a slave device 102 may receive, from a master device 104, a first set of communications associated with a first protocol. For example, a slave device 102 may communicate with a master device 104 via a Bluetooth communication link using an A2DP protocol. The slave device 102 may detect a communication from the master device 104 during a listening period 110, such as by initiating a listening window 202 that coincides with transmission of a communication by the master device 104. Upon detection of a communication, the slave device 102 may initiate a transaction period 120 during which the slave device 102 receives a communication from the master device 104 and transmits a response to the master device 104. The transaction period 120 may include any number of successive communications from the master device 104.

At block 404, the slave device 102 may determine a first count of communications associated with the first set of communications. For example, the master device 104 may transmit a single communication or multiple communications to the slave device 102. As described with regard to FIGS. 1-3, in some implementations, the count of successive communications transmitted by the master device 104 may be used to determine a length of the delay period 122. In some cases, other factors may also be used to determine the length of the delay period 122. For example, block 406 may determine first metric data associated with the first set of communications. Metric data may include a transaction length that is indicative of one or more of the time associated with transmission of the first set of communications or the time associated with transmission of one or more individual communications of the first set. Metric data may also include a type of data or format associated with the first set of communications, a bit rate, data compression rate, data throughput value, or airtime utilization value associated with the first set of communications, and so forth. The length of the delay period 122 may also be determined based in part on the metric data.

At block 408, the slave device 102 may receive, from the master device 104, a second set of communications associated with the first protocol. At block 410, the slave device 102 may determine a length of time between the first set of communications and the second set of communications. For example, after completing the first set of communications, the master device 104 may become idle for a length of time, such as when buffering or otherwise preparing the second set of communications for transmission to the slave device 102. The length of time determined by the slave device 102 may correspond to the amount of time that the master device 104 was idle.

At block 412, the slave device 102 may determine a second count of communications associated with the second set of communications. The second set of communications may include any number of successive communications from the master device 104. As such, the first count associated with the first set of communications may be greater than, less than, or equal to the second count associated with the second set of communications. At block 414, the slave device 102 may also determine second metric data associated with the second set of communications.

At block 416, the slave device 102 may determine a length of a delay time period based on the first count, the second count, the first metric data, and the second metric data. As described previously, the length of the delay period 122 may vary proportionally to the counts of communications. For example, if the first count and the second count are large, the length of the delay period 122 may be longer than if the first count and the second count are small. Additionally, the length of the delay period 122 may vary proportionally to the amount of time used to transmit the sets of communications or individual communications within the sets. For example, if a significant length of time is used to transmit a set of communications, the delay period 122 may be longer than if a short length of time is used to transmit the communications. Further, the length of the delay period 122 may vary inversely relative to a bit rate, data compression rate, or data throughput value associated with the sets of communications. For example, a shorter delay period 122 may be used when the data throughput associated with transmission of a set of communications is high, while a longer delay period 122 may be used when the data throughput associated with transmission of the set of communications is lower. In some implementations, counts of communications and metric data may be determined for multiple sets of communications received from the master device 104 over time. For example, the length of the delay period 122 may be determined based on an average count of communications within a set.

At block 418, the slave device 102 may determine a length of a transmission period 126 based on the length of time between the first set of communications and the second set of communications. For example, during a time when the master device 104 is idle, the slave device 102 may communicate data using a second protocol. Therefore, the length of the transmission period 126 may correspond to the length of time between the first set of communications and the second set of communications. For example, the length of the transmission period 126 may vary proportionally relative to the length of time between the first set and second set. In some implementations, the length of the transmission period 126 may be determined based on multiple lengths of time between sets of communications, determined over time. For example, the length of the transmission period 126 may be determined based on an average length of time between sets of communications received from the master device 104.

At block 420, the slave device 102 may determine that no communication has been received from the master device 104 for a length of time greater than or equal to the delay time period. This determination may indicate that the transaction period 120 between the master device 104 and slave device 102 has ended and that the master device 104 is currently idle. At block 422, the slave device 102 may begin communicating data associated with a second protocol. For example, subsequent to the lapse of the delay period 122, the slave device 102 may initiate a transmission period 126 during which the slave device 102 ceases to attempt to detect communications from the master device 104. During the transmission period 126, the slave device 102 may communicate data using the second protocol, uninterrupted by attempts to detect communications from the master device 104 using the first protocol.

At block 424, the slave device 102 may determine a lapse of the transmission period 126. For example, as described with regard to FIGS. 2 and 3, subsequent to the transmission period 126, the slave device 102 may initiate a listening period 110 and resume attempting to detect communications from the master device 104. At block 426, the slave device 102 may receive, from the master device 104, a third set of communications associated with the first protocol. Subsequent to completing a transaction period 120 associated with the third set of communications, the slave device 102 may initiate a subsequent delay period 122 and transmission period 126, followed by a subsequent listening period 110. As such, the process described with regard to FIG. 4 may be repeated for any number of sets of communications.

Figure 5:
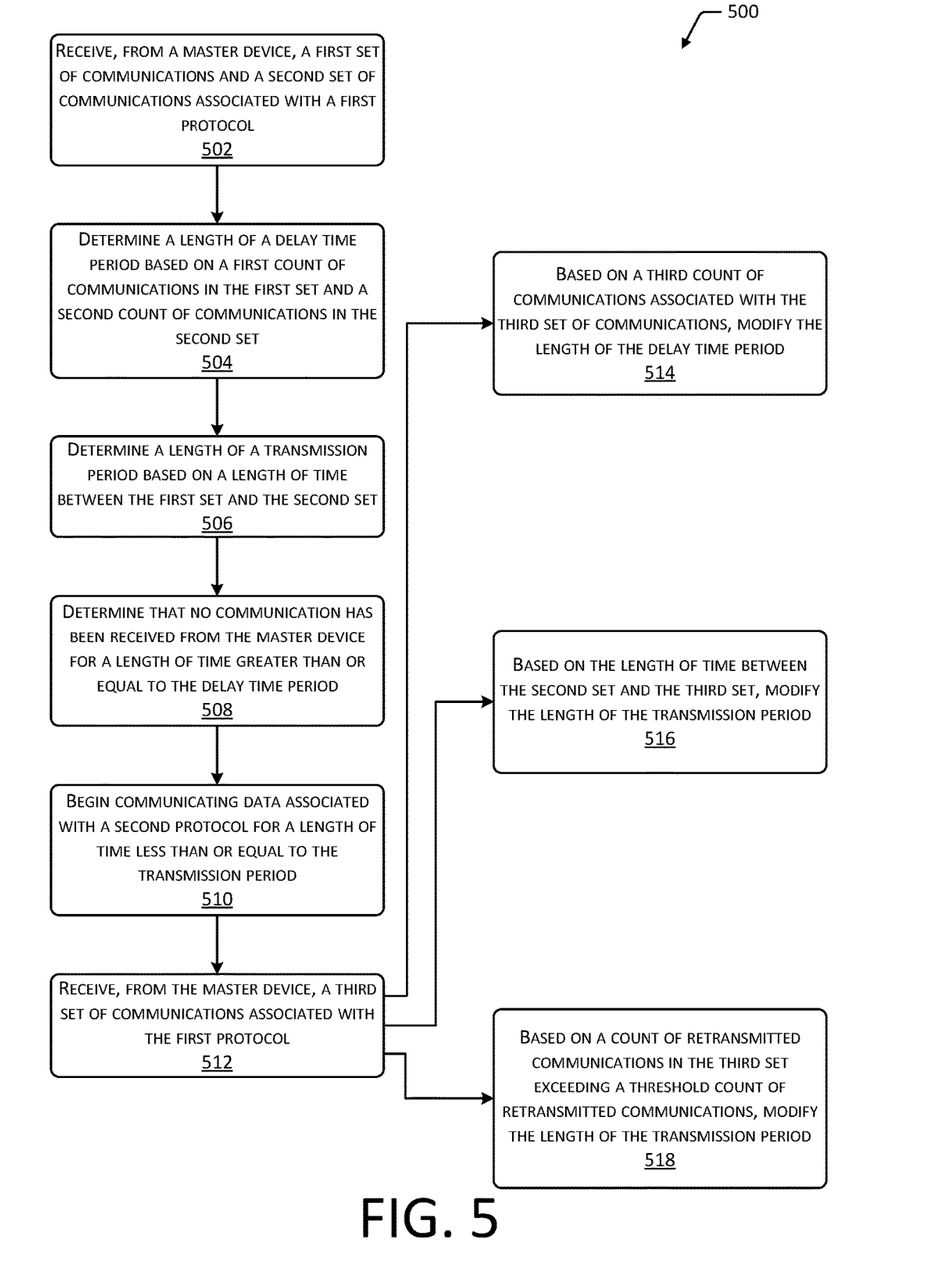
FIG. 5 is a flow diagram illustrating a method for determining and modifying a delay period and a transmission period.

FIG. 5 is a flow diagram 500 illustrating a method for determining and modifying a delay period 122 and a transmission period 126. At block 502, a slave device 102 may receive, from a master device 104, a first set of communications and a second set of communications associated with a first protocol. For example, the master device 104 may transmit a first set of communications to the slave device 102 at a first time. The first set of communications may include any number of successive communications. At a subsequent time, the master device 104 may transmit a second set of communications to the slave device 102 at a second time. The second set of communications may also include any number of successive communications.

At block 504, the slave device 102 or another computing device in communication therewith may determine a length of a delay time period based on a first count of communications in the first set and a second count of communications associated with the second set. As described previously, the length of the delay period 122 may vary proportionally relative to the counts of communications within one or more sets of communications received from the master device 104. For example, the delay period 122 associated with larger counts of communications may be longer than the delay period 122 associated with smaller counts of communications. In some implementations, the length of the delay period 122 may also be determined based on metric data, as described previously with regard to FIG. 4.

At block 506, the slave device 102, or another computing device in communication therewith, may determine a length of a transmission period 126 based on the length of time between the first set of communications and the second set of communications. For example, the length of the transmission period 126 may vary proportionally with regard to the length of time between the sets of communications. Continuing the example, if a master device 104 is typically idle for a significant length of time, such as 30 ms, between transmissions of communications, the transmission period 126 may be larger than if the master device 104 is typically idle for only 20 ms between transmissions of communications.

At block 508, the slave device 102 may determine that no communication was received from the master device 104 for a length of time greater than or equal to the delay period 122. This determination may indicate that the master device 104 has become idle. The determined length of time between the first set and second set of communications may correspond to the length of time that the master device 104 may remain idle. As such, at block 510, the slave device 102 may begin communicating data associated with a second protocol for a length of time less than or equal to the transmission period 126.

At block 512, the slave device 102 may receive, from the master device 104 a third set of communications associated with the first protocol. For example, subsequent to the lapse of the transmission period 126, the slave device 102 may attempt to receive communications from the master device 104, such as by initiating one or more listening windows 202 configured to detect communications from the master device 104. The slave device 102 may also determine a count of communications associated with the third set of communications, metric data associated with the third set, a length of time associated with the third set or individual communications within the third set, and so forth. In some implementations, one or more of the delay period 122 or the transmission period 126 may be modified based on data associated with the third set of communications.

For example, at block 514, based on a third count of communications associated with the third set, the length of the delay period 122 may be modified. Continuing the example, if the third count of communications includes a count of communications greater than the counts associated with the first or second set of communications, the length of the delay period 122 may be increased. Conversely, if the third count is less than the first count or the second count, the length of the delay period 122 may be decreased. In some implementations, the length of the delay period 122 may be determined based on an average value or a moving average value of multiple counts of communications, determined over a period of time.

As another example, at block 516, based on the length of time between the second set of communications and the third set of communications, the length of the transmission period 126 may be modified. Continuing the example, if the length of time between the second and third sets of communications is greater than the length of time between the first and second sets, the length of the transmission period 126 may be increased. If the length of time between the second and third sets is less than the length of time between the first and second sets, the length of the transmission period 126 may be decreased. In some implementations, the length of the transmission period 126 may be determined based on an average value or a moving average value of multiple lengths of time between sets of communications, determined over a period of time.

As yet another example, in some cases, the master device 104 may attempt to transmit one or more communications to the slave device 102 during the transmission period 126. In such cases, the slave device 102 may fail to receive the communications, and the master device 104 may retransmit the unreceived communications as part of the subsequent set of communications provided to the slave device 102. At block 518, based on a count of retransmitted communications in the third set exceeding a threshold count of retransmitted communications, the length of the transmission period 126 may be modified. For example, if the third set of communications includes three retransmitted communications that were not received by the slave device 102 due to the length of the transmission period 126, and the threshold count of retransmitted communications is two, the length of the transmission period 126 may be decreased. If the count of retransmitted communications does not exceed a threshold count, the length of the transmission period 126 may remain unchanged or may be increased. The threshold count may include any number of retransmitted communications, including a single retransmitted communication.

Figure 6:
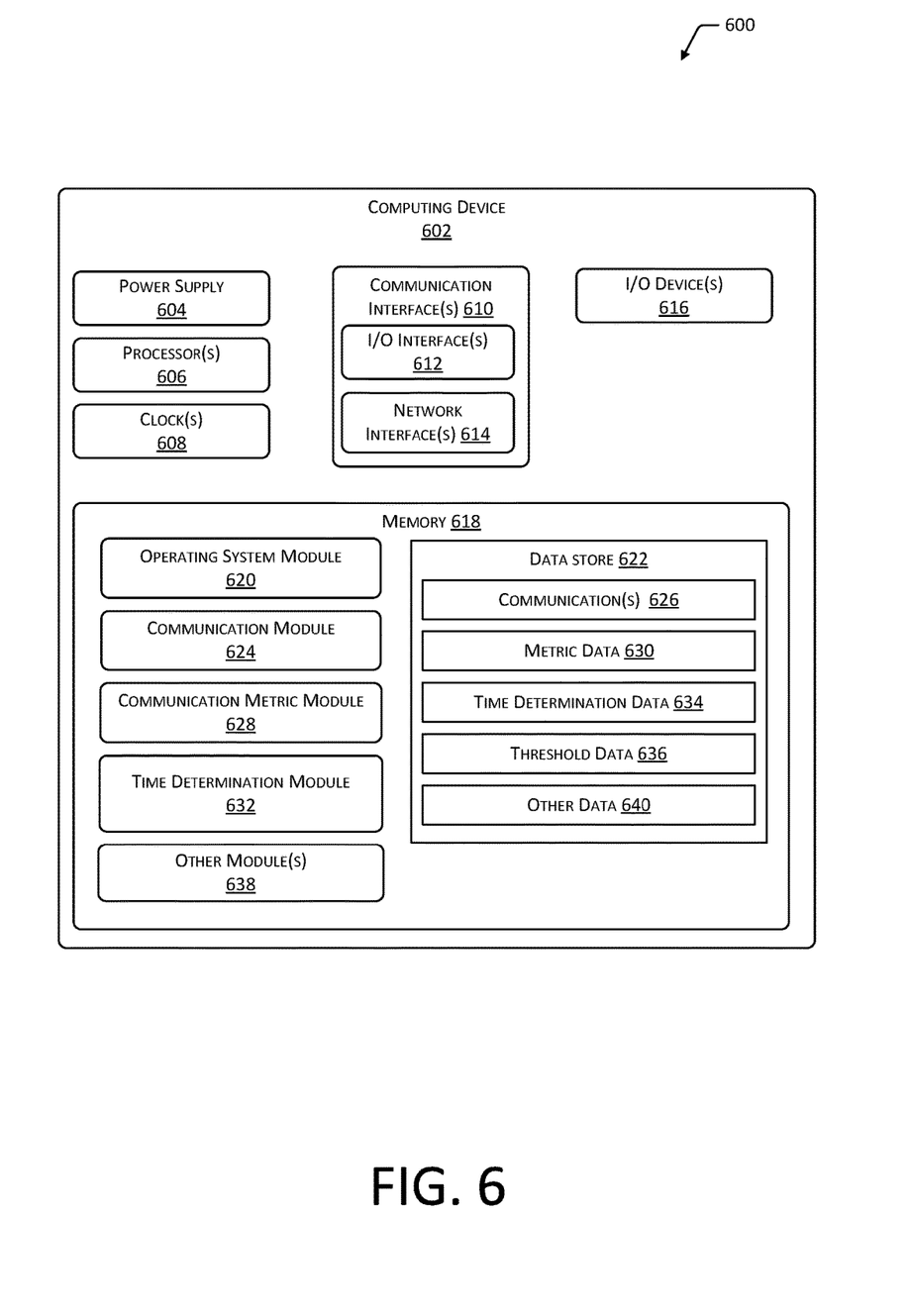
FIG. 6 is a block diagram illustrating an implementation of a computing device within the scope of the present disclosure.

FIG. 6 is a block diagram 600 illustrating an implementation of a computing device 602 within the scope of the present disclosure. The computing device 602 may include a slave device 102, however, in other implementations, one or more functions described with regard to the computing device 602 may be performed by a master device 104 or another computing device 602 in communication with the slave device 102. Additionally, while FIG. 6 depicts a single block diagram 600 illustrating a single computing device 602, in other implementations, any number and any combination of one or multiple types of computing devices 602 may be used to perform any of the functions described herein, such as by using a distributed network of computing devices 602.

One or more power supplies 604 may be configured to provide electrical power suitable for operating the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth. The clock 608 may also be used to determine lengths of time associated with transmission and receipt of data and the lapsing of time periods such as the delay period 122 or transmission period 126.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include buttons, touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with the computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device 602 may include one or more busses or other internal communications hardware or software that allows for the transfer of data between the various modules and portions of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communication with other computing devices 602. For example, the communication module 624 may transmit and receive communications 626 between a slave device 102, a master device 104, or other computing devices 602 in communication therewith. Communications 626 may include any type of data, such as audio data for generation of an audio output, confirmation or acknowledgements indicating receipt of data, requests for data, and so forth.

The memory 618 may also store a communication metric module 628. The communication metric module 628 may determine metric data 630 associated with one or more communications 626. Metric data 630 may determine a count of successive communications 626 received from a computing device 602, a length of time associated with the receipt of individual communications 626 or sets of communications 626, or a type of data or format associated with the communications 626. Metric data 630 may also include data indicative of characteristics of the transmission or receipt of communications 626, such as a bit rate, data throughput value, airtime utilization value, or data compression rate. Metric data 630 may also include lengths of time during which communications 626 are not transmitted or received, such as periods of time between receiving sets of communications 626 from a master device 104. In some implementations, metric data 630 may also include a count of retransmitted communications 626 included in a set of communications 626 or a total count of retransmitted communications 626 received by the computing device 602 over one or more selected periods of time.

The memory 618 may also store a time determination module 632, which may determine lengths of the delay period 122 and transmission period 126 based on the metric data 630 and time determination data 634. Time determination data 634 may include one or more rules, algorithms, equations, tables, and so forth that may associate particular metric data 630, such as counts of communications 626 or lengths of time associated with communications 626, with corresponding lengths of delay periods 122. Time determination data 634 may also associate particular metric data 630, such as lengths of time between sets of communications 626 with lengths of transmission periods 126. In some implementations, the time determination module 632 may also access threshold data 636, which may indicate particular values for metric data 630, such as a threshold quantity of retransmitted communications 626. One or more of the communication module 624, communication metric module 628, time determination module 632, or another module may determine the start and end of the determined delay period 122 and transmission period 126.

Other modules 638 may also be present in the memory 618. For example, encryption modules may be used to encrypt and decrypt communications 626 between computing devices 602. User interface modules may be configured to receive and modify user settings, configurations and preferences, default settings, and so forth. Other modules 638 may also include modules for generating output based on the data associated with the communications 626, such as modules for generating an audio output based on audio data. Other modules 638 may additionally include modules for forming groups of devices, such as modules for detecting and communicating with other computing devices 602 and generating a synchronized output in conjunction with the other computing devices 602.

Other data 640 within the data store 622 may include default configurations and settings associated with computing devices 602. For example, the other data 640 may include a default length of a delay period 122 and transmission period 126 that may be used prior to determining metric data 630 associated with communications 626 received from a master device 104. Other data 640 may also include security data, such as encryption keys and schema, access credentials, and so forth.

In different implementations, different computing devices 602 may have different capabilities or capacities. For example, servers, personal computing devices 602, and portable computing devices 602 may have significantly more processor 606 capability and memory 618 capacity compared to the processor 606 capability and memory 618 capacity of freestanding audio devices.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive, via a Bluetooth communication link, a first set of communications from a master device;
provide a first response to the master device via the Bluetooth communication link;
receive, via the Bluetooth communication link, a second set of communications from the master device;
provide a second response to the master device via the Bluetooth communication link;
determine a first count of communications associated with the first set of communications;
determine a second count of communications associated with the second set of communications;
based on the first count and the second count, determine a length of a delay time period indicative of a first length of time that indicates the master device has ceased transmitting via the Bluetooth communication link, wherein the first length of time is proportional to the first count and the second count;
determine a second length of time between the first set of communications and the second set of communications during which no communication was received from the master device;
determine an idle time indicative of a third length of time between sets of communications from the master device, wherein the idle time corresponds to the second length of time;
determine a lack of receipt of communications from the master device for a fourth length of time greater than or equal to the length of the delay time period;
in response to the lack of receipt of communications for the fourth length of time, exchange data with one or more of the master device or a second device via one or more Wi-Fi communication links for a first duration, the first duration having a fifth length of time less than or equal to the idle time; and
subsequent to the first duration, receive at least one subsequent communication from the master device via the Bluetooth communication link.

2. The system of claim 1, further comprising computer-executable instructions to:

determine a transmission rate associated with the first set of communications and the second set of communications;

wherein the first duration is further determined at least in part based on the transmission rate, and the first duration is inversely proportional relative to the transmission rate.

3. The system of claim 1, further comprising computer-executable instructions to:
   determine a time associated with transmission of one or more of:
      the first set of communications;
      a single communication of the first set of communications;
      the second set of communications; or
      a single communication of the second set of communications;
   wherein the length of the delay time period is further determined at least in part based on the time associated with the transmission and is proportional to the time associated with the transmission.

4. The system of claim 1, further comprising computer-executable instructions to:
   prior to receiving the first set of communications, initiate a receive state to receive communications from the master device;
   during the first duration, cease receiving communications from the master device; and
   subsequent to the first duration, initiate the receive state.

5. A method comprising:
   receiving a first set of communications from a first device, wherein the first set of communications is associated with a first protocol;
   receiving a second set of communications from the first device, wherein the second set of communications is associated with the first protocol;
   determining a first length of time between the first set of communications and the second set of communications that is indicative of a first transmission period;
   determining one or more of: a first count of communications within the first set, a second count of communications in the second set, a first time associated with transmission of the first set, or a second time associated with transmission of the second set;
   based on the one or more of the first count, the second count, the first time, or the second time, determining a length of a delay time period;
   determining a lapse of the delay time period subsequent to receiving the second set of communications;
   in response to the lapse of the delay time period and during a second transmission period for a second length of time that is less than or equal to the first length of time, communicating-data associated with a second protocol with one or more of the first device or a second device; and
   subsequent to the lapse of the second transmission period, receiving a third set of communications associated with the first protocol from the first device.

6. The method of claim 5, wherein the length of the delay time period is proportional to the one or more of the first count or the second count.

7. The method of claim 5, wherein the first length of time is associated with receipt of at least one communication of the first set of communications.

8. The method of claim 5, further comprising ceasing receipt of communications associated with the first protocol from the first device during the first transmission period.

9. The method of claim 5, further comprising:
   determining one or more of a data throughput, a bit rate, or an airtime utilization associated with the first set of communications and the second set of communications; and
   determining the second length of time based at least in part on the one or more of the data throughput, the bit rate, or the airtime utilization.

10. The method of claim 9, further comprising:
    determining that one or more of the data throughput, the bit rate, or the airtime utilization associated with the third set of communications differs from the one or more of the data throughput, the bit rate, or the airtime utilization associated with the first set of communications and the second set of communications; and
    modifying the second length of time based on a difference between the one or more of the data throughput, the bit rate, or the airtime utilization associated with the third set of communications and the one or more of the data throughput, the bit rate, or the airtime utilization associated with the first set of communications and the second set of communications.

11. The method of claim 5, further comprising:
    receiving one or more retransmitted communications from the first device subsequent to the second transmission period;
    determining that a count of retransmitted communications associated with the one or more retransmitted communications exceeds a threshold count; and
    setting a third transmission period to a third length of time less than the first length of time.

12. The method of claim 5, further comprising:
    determining one or more of a data throughput, a bit rate, or an airtime utilization associated with the data using the second protocol; and
    determining the first length of time based at least in part on the one or more of the data throughput, the bit rate, or the airtime utilization.

13. A system comprising:
    one or more memories storing computer-executable instructions; and
    one or more hardware processors to execute the computer-executable instructions to:
       receive a first set of communications from a first device, wherein the first set of communications is associated with a first protocol;
       determine a first count of communications associated with the first set of communications;
       receive a second set of communications from the first device, wherein the second set of communications is associated with the first protocol;
       determine a second count of communications associated with the second set of communications;
       determine a first length of time between the first set of communications and the second set of communications indicative of a first transmission period;
       determine a length of a delay time period based at least in part on the first count and the second count;
       subsequent to receiving the second set of communications from the first device, determine a lapse of the delay time period;
       in response to the lapse of the delay time period and during a second transmission period for a second length of time that is less than or equal to the first length of time, communicate data associated with a second protocol with one or more of the first device or a second device; and subsequent to the lapse of the second transmission period, receive a third set of communications associated with the first protocol from the first device.

14. The system of claim 13, further comprising computer-executable instructions to:

cease receipt of communications associated with the first protocol during the first transmission period.

15. The system of claim 14, further comprising computer-executable instructions to:

determine one or more of a type of content, a transmission rate, or a format of the data associated with the second protocol, wherein the second length of time is further determined based at least in part on the one or more of the type of content, the transmission rate, or the format.

16. The system of claim 13, further comprising computer-executable instructions to:

determine a third length of time associated with transmission of one or more of:
 the first set of communications; or
 a single communication of the first set of communications;

wherein the length of the delay time period is further determined at least in part based on the third length of time associated with the transmission.

17. The system of claim 13, further comprising computer-executable instructions to:

cease receiving communications associated with the first protocol during communication of the data associated with the second protocol; and initiate a receive state to receive communications associated with the first protocol after communication of the data associated with the second protocol.

18. The system of claim 17, further comprising computer-executable instructions to:

communicate the data associated with the second protocol for a transmission period; and subsequent to the second transmission period, receive one or more retransmitted communications associated with the first device in a third transmission period.

19. The system of claim 17, further comprising computer-executable instructions to:

determine a lack of receipt of a communication associated with the first protocol; and communicate the data associated with the second protocol during the receive state concurrent with the lack of receipt of the communication.

20. The system of claim 13, further comprising computer-executable instructions to:

determine one or more of:
 a third count of communications associated with the third set of communications;
 a third length of time associated with transmission of the third set of communications; or
 a fourth length of time associated with a single communication of the third set of communications; and modify the length of the delay time period based on the one or more of the third count, the third length of time associated with transmission of the third set of communications, or the fourth length of time associated with transmission of the single communication.

* * * * *

UNITED STATES PATENT AND TRADEMARK OFFICE
CERTIFICATE OF CORRECTION

Page 1 of 1

PATENT NO. : 10,425,508 B1
APPLICATION NO. : 15/612430
DATED : September 24, 2019
INVENTOR(S) : Patel et al.

It is certified that error appears in the above-identified patent and that said Letters Patent is hereby corrected as shown below:

In the Claims

Column 19, Line 55:
Currently reads:
"communicating-data associated with..."
Where it should read:
--communicating data associated with...--

Signed and Sealed this
Twelfth Day of November, 2019

Andrei Iancu
*Director of the United States Patent and Trademark Office*